(12) United States Patent
Wen et al.

(10) Patent No.: US 6,341,959 B1
(45) Date of Patent: Jan. 29, 2002

(54) METHOD AND SYSTEM FOR LEARNING A LANGUAGE

(75) Inventors: Sayling Wen, Taipei; Fred H. Y. Chen, Chung-He, both of (TW); Great W. H. He; Hope H. R. Gao, both of Hsi-An (CH)

(73) Assignee: Inventec Besta Co. Ltd., Taipei (TW)

( * ) Notice: Subject to any disclaimer, the term of this patent is extended or adjusted under 35 U.S.C. 154(b) by 0 days.

(21) Appl. No.: 09/535,472

(22) Filed: Mar. 23, 2000

(51) Int. Cl.7 .................................................. G09B 5/00
(52) U.S. Cl. ........................ 434/169; 434/156; 434/167; 434/362; 704/277; 706/927
(58) Field of Search .............................. 434/118, 156, 434/157, 159, 167, 169, 307 R, 308, 322, 323, 327, 350, 353, 362, 365; 345/173; 463/40; 700/86, 247; 706/11, 46, 47, 54, 62, 927; 704/2, 8, 9, 257, 258, 270, 275, 277; 705/5, 7, 14; 707/2–4, 500, 531; 713/321, 323; 358/1.1, 1.11, 1.15, 1.17, 1.2, 1.9

(56) References Cited

U.S. PATENT DOCUMENTS

| | | | | |
|---|---|---|---|---|
| 4,787,035 A | * | 11/1988 | Bourne | 700/247 |
| 5,259,766 A | * | 11/1993 | Sack et al. | 434/362 |
| 5,265,014 A | * | 11/1993 | Haddock et al. | 704/9 |
| 5,379,057 A | * | 1/1995 | Clough et al. | 345/173 |
| 5,490,061 A | * | 2/1996 | Tolin et al. | 704/2 |
| 5,581,664 A | * | 12/1996 | Allen et al. | 706/46 |
| 5,657,256 A | * | 8/1997 | Swanson et al. | 713/321 |
| 5,677,835 A | * | 10/1997 | Carbonell et al. | 704/8 |
| 5,729,659 A | * | 3/1998 | Potter | 704/270 |
| 5,748,841 A | * | 5/1998 | Morin et al. | 704/257 |
| 5,907,831 A | * | 5/1999 | Lotvin et al. | 705/14 |
| 6,018,617 A | * | 1/2000 | Sweitzer et al. | 358/1.15 |
| 6,173,154 B1 | * | 1/2001 | Kucinski et al. | 434/359 |
| 6,202,064 B1 | * | 3/2001 | Julliard | 707/5 |
| 6,233,545 B1 | * | 5/2001 | Datig | 704/2 |
| 6,259,890 B1 | * | 7/2001 | Driscoll et al. | 434/350 |
| 6,292,792 B1 | * | 9/2001 | Baffes et al. | 706/45 |

\* cited by examiner

Primary Examiner—Joe H. Cheng
(74) Attorney, Agent, or Firm—W. Wayne Liauh

(57) ABSTRACT

This specification discloses a method and system for learning a language. This invention takes the language data selected by a learner or a default test base as the learning content and improves the learner's language ability through tests about the learning content. The learner is allowed to arbitrarily update the language data stored in a learning database. The system according to the present invention contains a grammar analysis engine. This engine analyzes the grammar of the language data in the learning database according to the grammatical rules collected and stored in a language grammar database, converts the language data in the learning database into test problems according to the problem models stored in a problem model database, and finally performs language tests using the grammar analysis processor and provides the test results (such as error analysis and explanation). This provides a language learning system that allows a learner to provide or update learning data and generates test problems accordingly.

10 Claims, 7 Drawing Sheets

METHOD AND SYSTEM FOR LEARNING A LANGUAGE

BACKGROUND OF THE INVENTION

1. Field of Invention

The present invention relates to a method and system for learning a language through a computer. More particularly, the invention relates to a method and system for learning a language through electronic devices such as a personal computer (PC), a notebook, a handheld personal computer (HPC), electronic translator and other devices with similar functions.

2. Related Art

There are already many language learning programs available on the market for users to learn a language (such as English) through a personal computer (PC), a notebook, a handheld personal computer (HPC), electronic translator and other electronic devices with similar functions. One of the main features of this type of language learning software is the grammar learning function. Ordinary computer learning software stores test problems designed manually in advance into a database for training and practice. The drawback is that the learner can not update the learning data and test problems in the test base according to his or her practical needs or learning goal. On the other hand, the problem models are designed beforehand and can not be changed or modified.

SUMMARY OF THE INVENTION

In view of the foregoing, it is an object of the present invention to provide a new language learning software and system to prevent the defects in the aforementioned language learning software. The language learner can update the language data in the database according to contents (such as the texts, real-time news, articles) that he or she wants to learn so that the actual contents can match with the learning progress closely.

It is also an object of the present invention to provide a new language learning software and system that allows multiple problem model practices so that the learner can master the usage of vocabulary and grammar from different perspectives.

The method disclosed in the present invention is the one that takes the language data provided by the learner and automatically generates test problems accordingly so as to improve the learner's language ability through tests.

The language learning system according to the invention comprises:

a learning database, which stores the language data that the learner wants to learn, such as texts, real-time news, articles, or a completed test base provided by the learner;

a grammar database, which collects the grammar of the language (such as English) including the plural forms of nouns, tenses of verbs, voice, active or passive voices, word form transformations, etc, to provide grammatical rules;

a problem model database, which stores all sorts of different test problem models for the learner to select; and a grammar analysis engine, which is a program running on a computer and includes functions such as analyzing the grammar of the language data stored in the learning database, converting the language data into test problems according to the problem models in the problem database, and performing language tests and providing test results (such as error analysis and explanation).

In another preferred embodiment of the present invention, the language learning system further comprises the function of an electronic dictionary. The learner can look up any unknown word while doing problems to fully comprehend the problem contents and learn the word.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
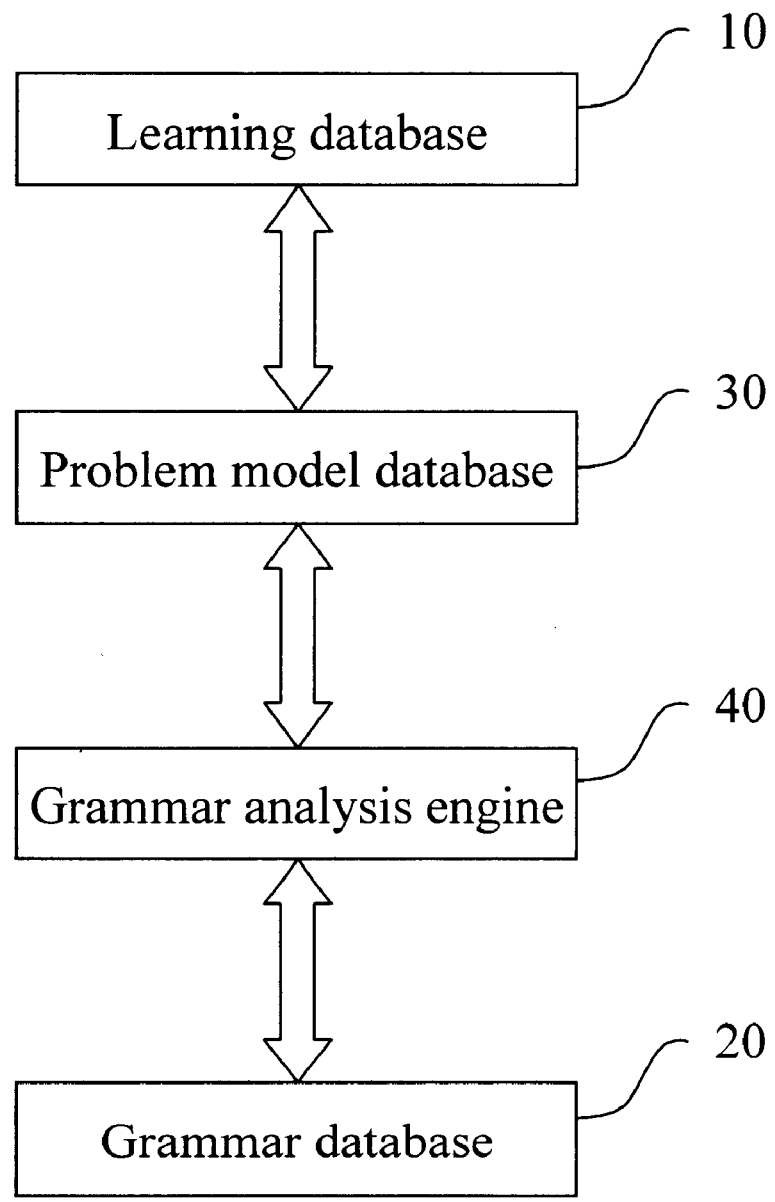
FIG. 1 is a logic block diagram of the system according to the present invention.
Figure 2:
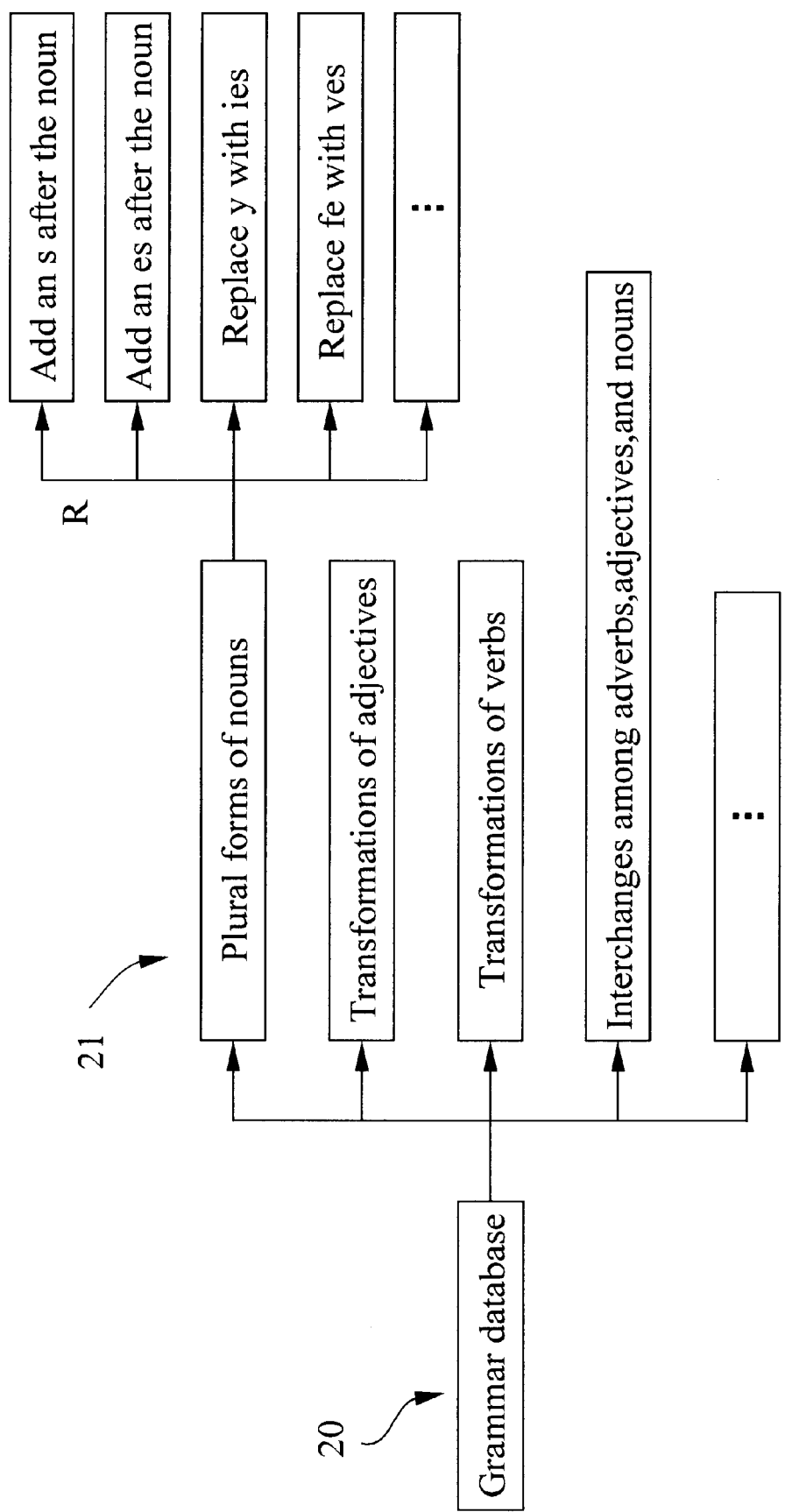
FIG. 2 shows the data structure of the grammar database of the invention.
Figure 3:
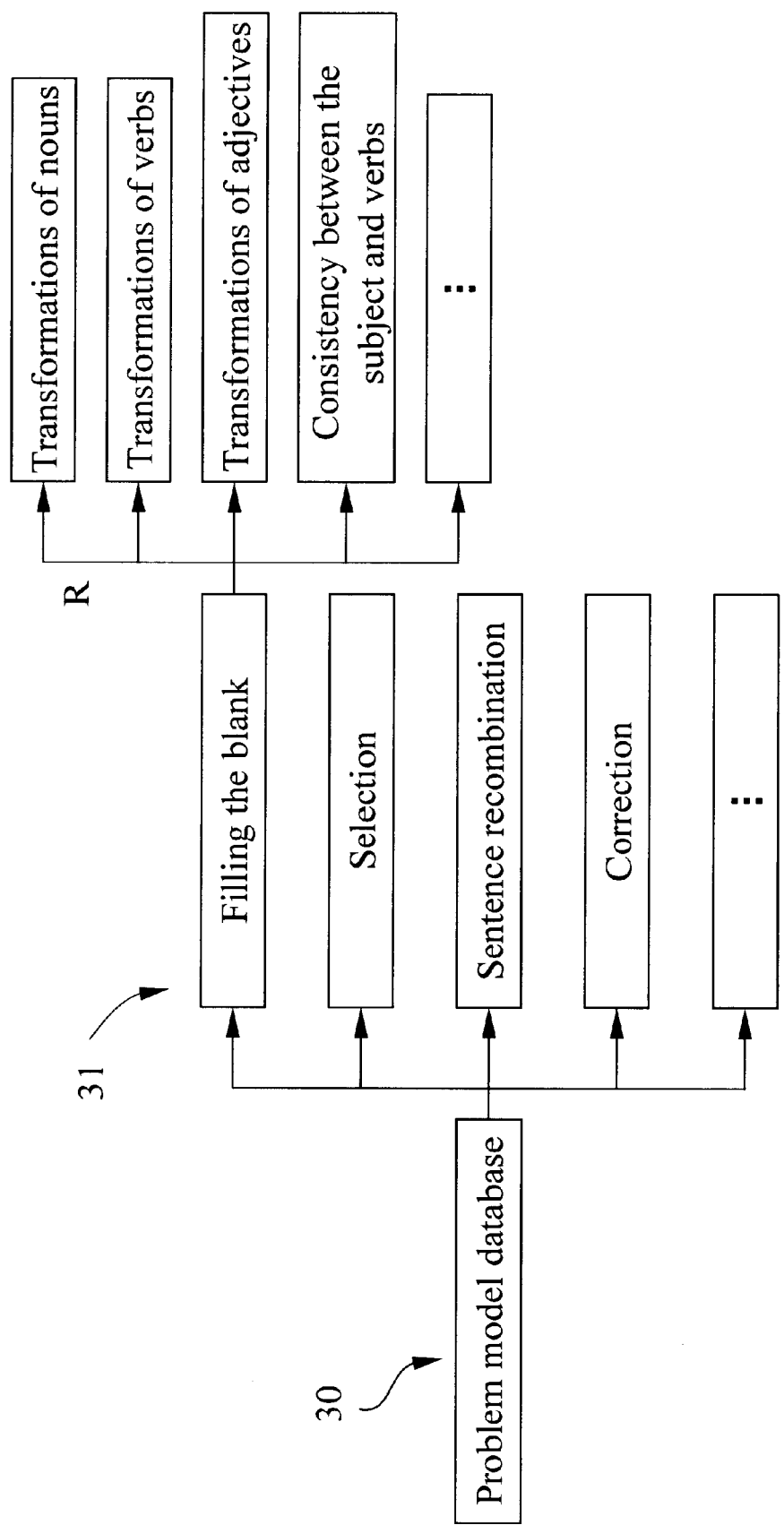
FIG. 3 shows the data structure of the problem model database of the invention.

Referring to FIG. 1, the language learning system of the present invention is built within a computer. By computer is meant electronic devices such as a personal computer (PC), a notebook, a handheld personal computer (HPC), electronic translator and other electronic devices with similar functions. Through the operation of the system over the computer, the invention achieves the object of allowing the user to learn a language. The language learning system comprises:

a learning database 10, which stores the language data that the learner wants to learn, such as texts, real-time news, articles, or a completed test base provided by the learner;

a grammar database 20, which collects the grammar of the language (such as English) including the plural forms of nouns, tenses of verbs, voice, active or passive voice, word form transformations, etc, to provide grammatical rules, wherein the data entry 21 and the relationship R with others are shown in FIG. 2;

a problem model database 30, which stores all sorts of different test problem models for the learner to select, wherein the data entry 31 and the relationship R with others are shown in FIG. 3; and a grammar analysis engine 40, which is a program running on a computer or a firmware recorded in read only memory (ROM) or other chips and includes functions such as analyzing the grammar of the language data stored in the learning database 10, converting the language data stored in the learning database 10 into test problems according to the problem models in the problem database 30, and performing language tests and providing test results (such as error analysis and explanation).

Figure 7:
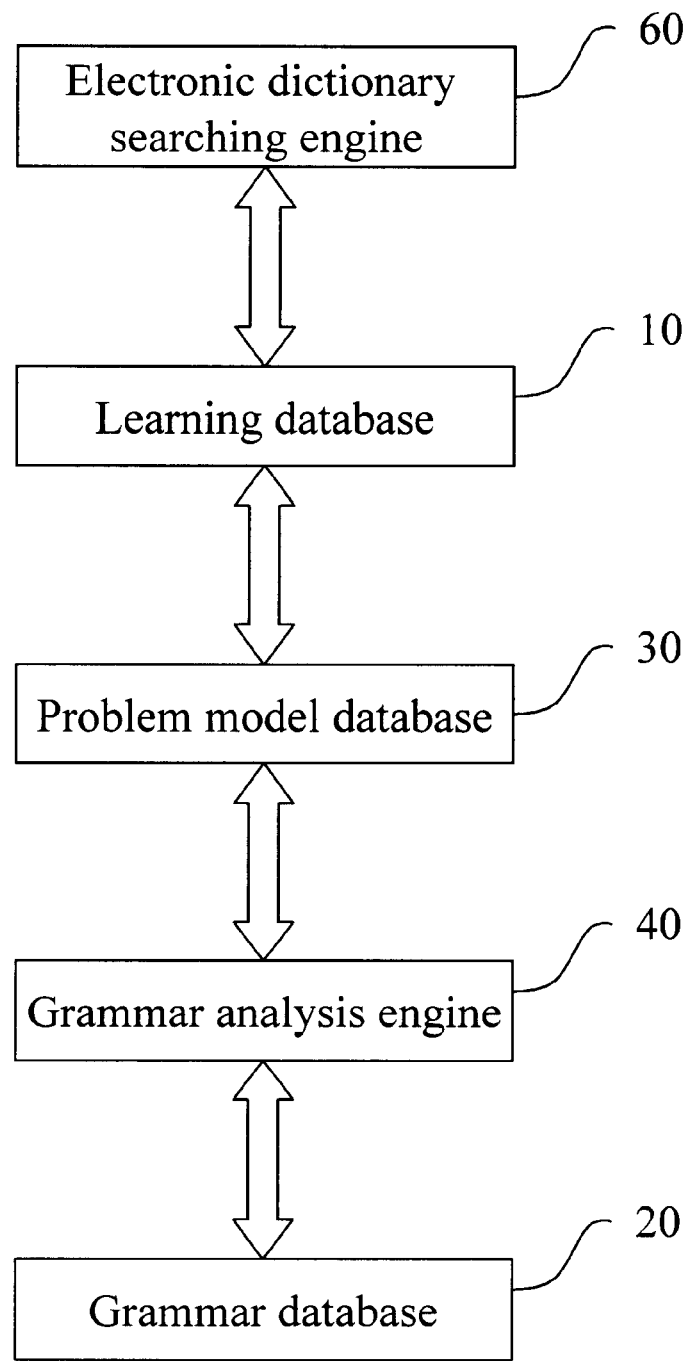
FIG. 7 is the logic block diagram of another embodiment system of the invention.

In addition, the system of the present invention can also include an electronic dictionary engine 60 (FIG. 7), from which the learner can look up any unknown word while doing practices so as to fully comprehend the problem contents.

Figure 4:
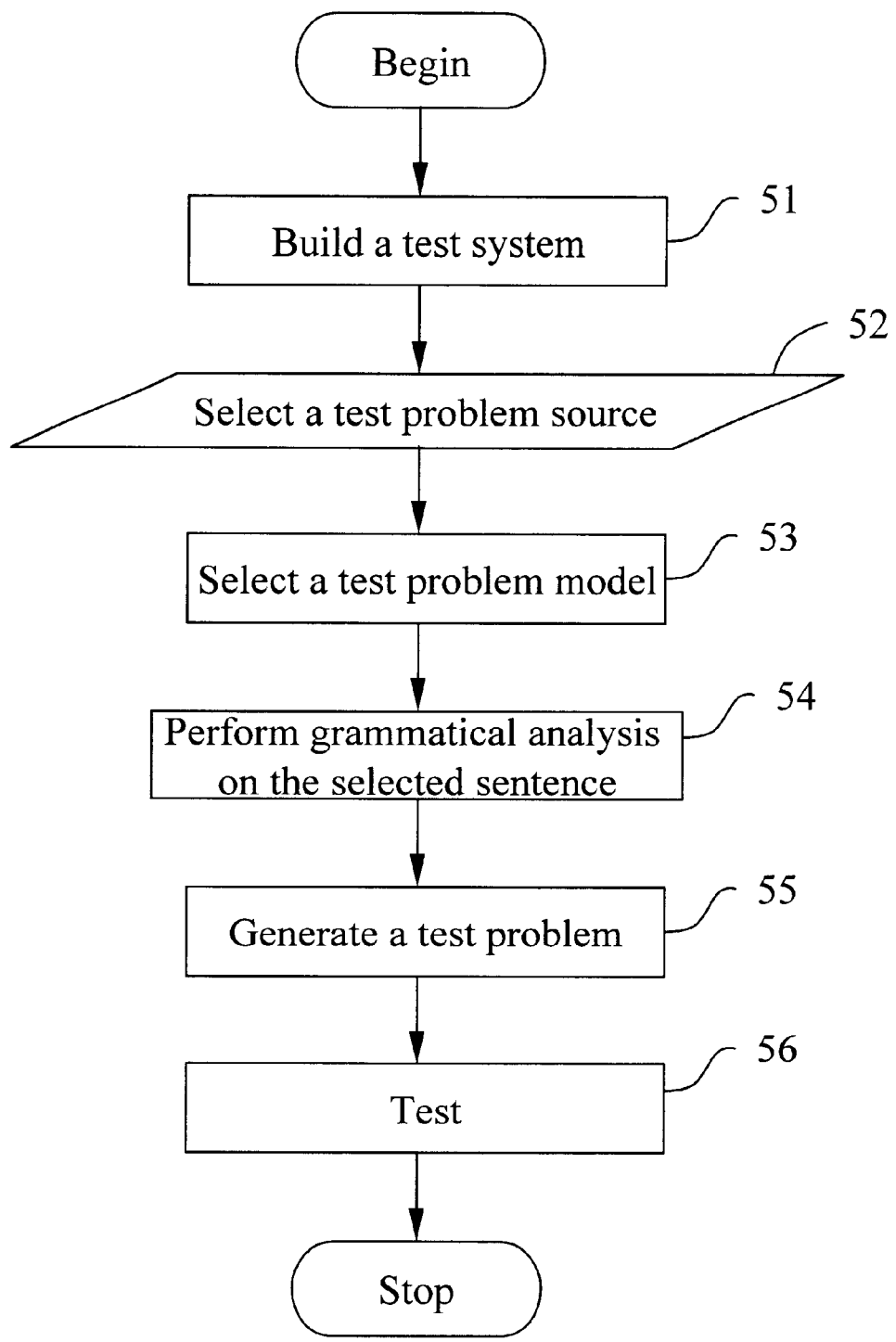
FIG. 4 is a flow chart of the ma in steps in the method of the present invention.

With reference to FIG. 4, the language learning method of the invention is implemented through tests. The method comprises the steps of:

Step 51: building a test system comprising a learning database 10, a grammar database 20, a problem model database 30, and a grammar analysis engine 40;

Step 52: selecting the problem source by choosing certain learning data from the learning database 10, wherein the choice can be made either by the learner through input devices such as a mouse or keyboard or by the grammar analysis engine 40 of the system in random;

Step 53: selecting test problem models from the problem model database 30, wherein the selection can be made either by the learner through input devices such as a mouse or keyboard or by the grammar analysis engine 40 of the system in random;

Step 54: analyzing the grammar of the selected learning data by, for example, finding all the nouns, adjectives, verbs, and so on from a paragraph of the selected text and storing them into a buffer;

Step 55: generating test problems by converting the grammatically analyzed learning data into test problems according to the selected problem models; and Step 56: performing the test.

Figure 5:
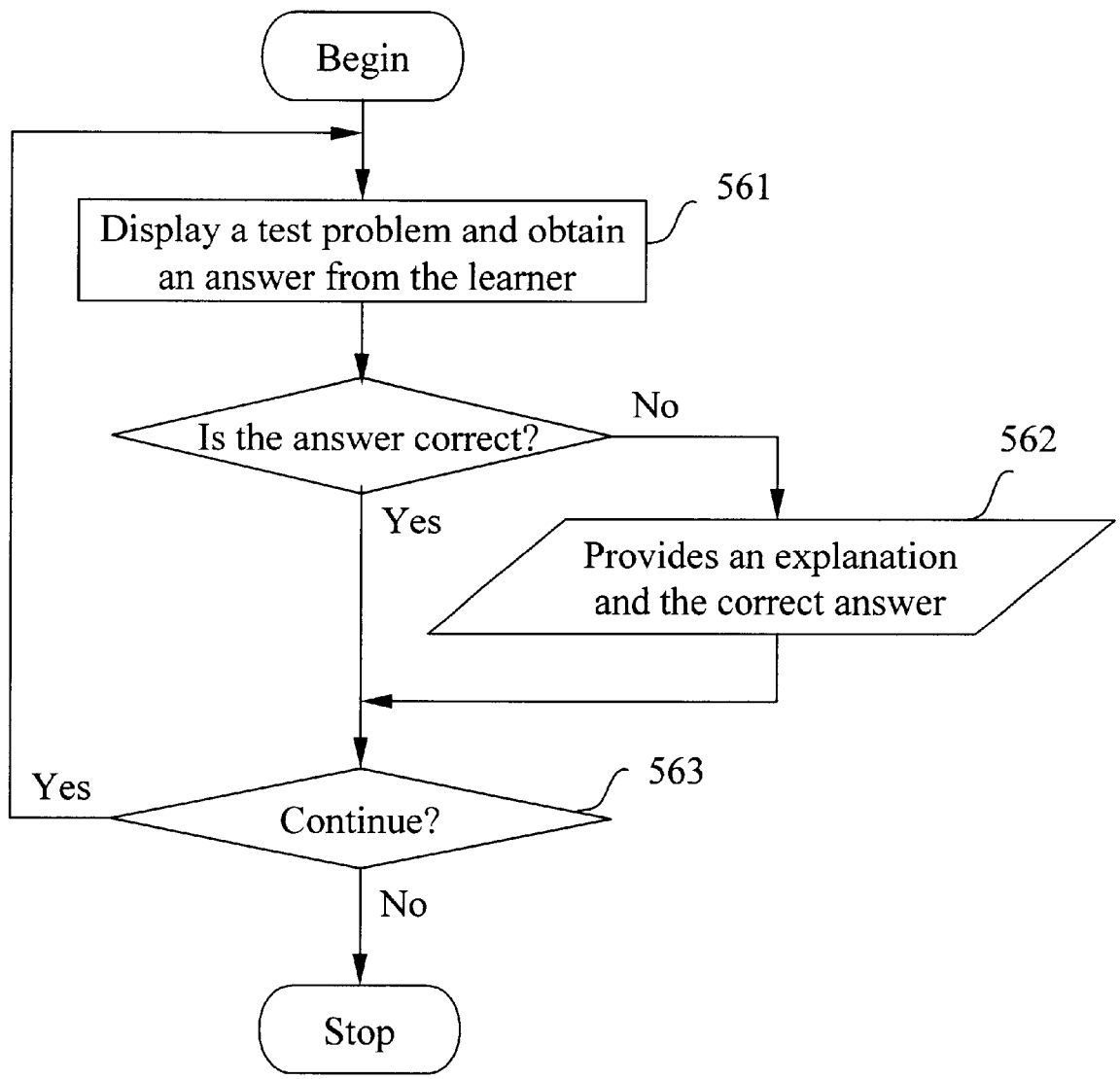
FIG. 5 is a flow chart of performing a test according to the present invention.

A preferred embodiment of performing the test in the aforementioned Step 56 is shown in FIG. 5 and further comprises the steps of:

Step 561: displaying a test problem on output devices such as a monitor or an LCD display and obtaining an answer from the learner through input devices such as a mouse or keyboard;

Step 562: displaying the correct answer and grammatical explanation if the answer is incorrect; whereas going on to the next step if the answer is correct;

Step 563: returning to Step 52 and selecting the next test data if the learner chooses to continue the test, or finishing the test.

Figure 6:
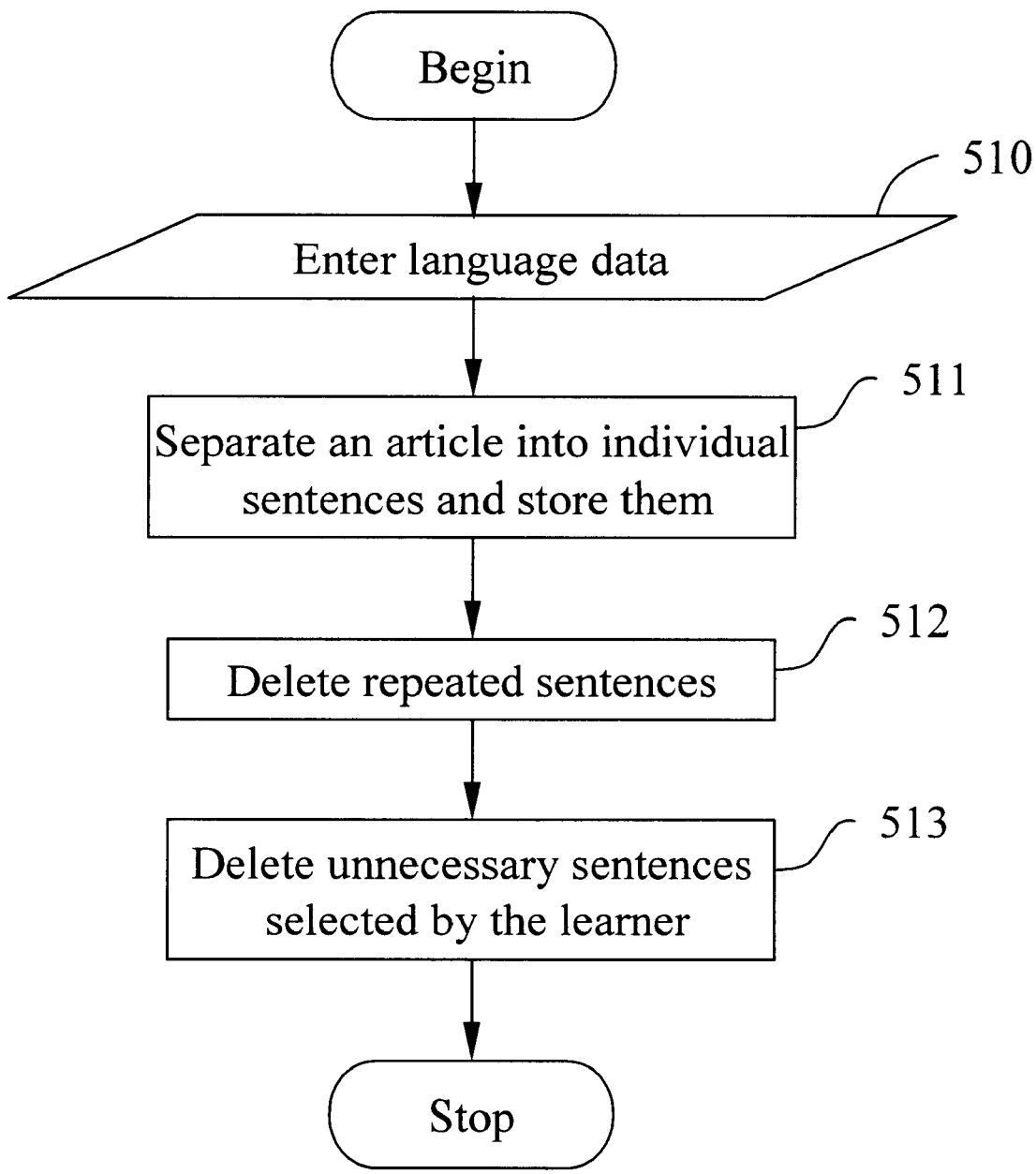
FIG. 6 is a flow chart of the steps toward building and updating the learning database of the invention.

Referring to FIG. 6, building a learning database 10 in Step 51 further comprises the step of updating the learning database 10 through the following steps:

Step 510: entering the learning data provided by the learner into the learning database 10, for example, uploading language data such as a text, real-time news or articles through a keyboard or other means;

Step 511: processing sentences by separating the article into individual sentences and storing them into a recording media accessible by the computer, such as a hard disk drive (HDD), floppy disk, CD-ROM or tape;

Step 512: deleting repeated sentences to save storage space in the learning database 10; and Step 513: deleting sentences that the learner considers as improper or unnecessary.

The actual operation procedure of the present invention is elucidated by the following example of learning English for a Chinese speaker.

A. Building a Grammar Database 20

As shown in FIG. 2, this grammar database 20 collects basic grammar rules that include English word form transformations such as plural forms of nouns, irregular verb forms, the comparative and superlative degrees of adjectives, and consistency check between subjects and verbs.

B. Building and Updating the Learning Database 10

According to the flow chart of building, updating, and processing procedures shown in FIG. 6, the learning database 10 is a database that can be updated at any time. It can consist of all example sentences in the electronic dictionary 60 and can also include English texts, real-time news, and articles entered by the learner. This learning database 10 can be expanded and updated at any moment by storing new data in the database.

For example, one can store the following paragraph of English article in the learning database 10:

The Chinese calendar contains cycles of twelve years. A different animal represents each year. The first year of the cycle is the year of the rat. After that comes the year of the ox, the year of the tiger, the rabbit, the dragon, the snake, the horse, the goat, the monkey, the rooster, the dog and pig. After the pig the cycle begins again.

The system then separates this paragraph into individual sentences according to the punctuation (such as period, question mark, exclamation mark, etc) in the English article and stores them into the database. Repeated sentences are just saved once, if any.

At this moment, the learner can delete some of the sentences according to the needs. Furthermore, the learning database 10 can be a test problem database that contains many test problems designed in advance.

For the example given above, the paragraph is separated into the following sentences:

1. The Chinese calendar contains cycles of twelve years.
2. A different animal represents each year.
3. The first year of the cycle is the year of the rat.
4. After that comes the year of the ox, the year of the tiger, the rabbit, the dragon, the snake, the horse, the goat, the monkey, the rooster, the dog and pig.
5. After the pig the cycle begins again.

C. Building Problem Model Database 30

As shown in FIG. 3, the test problem models designed to meet the needs can have styles such as blank-filling, selection, sentence recombination, correction, etc. Each problem model is specifically defined, and the corresponding program is designed so that the sentences in the problem comply with the requirement of the problem model. For instance, the problem of filling the blank is made by removing one word from a sentence, providing a transformed word for that word according to the grammar database 20, and asking the learner to fill the blank with the correct form of the transformed word. The selection problem can be made by removing one word in the sentence and finding three other words from the learning database 10 similar in form, meaning, or pronunciation to make up selection items and ensuring the uniqueness of the correct answer at the same time. The learner is then asked to select a correct answer from those four items. The sentence recombination problem can be made by processing each word in the sentence of the learning database to find the corresponding transformation according to the grammar database 20, and reordering the words to ask the learner to form a complete sentence.

When performing a test, as shown in FIG. 1, the sentences in the learning database 10 are first processed to find suitable problem models in the problem model database 30. The words in the sentences are also analyzed according to the grammar database by the grammar analysis engine 40. The sentences are then modified according to the problem model to form a practice problem for the learner. The grammar analysis engine 40 analyzes the learner's answer. The system displays error information and provides the correct answer and explanation if the learner is wrong.

The procedure flows in FIGS. 4 and 5 are further explained hereinafter by taking the first sentence in the above English article as an example to form the problems of filling the blank, selection, and sentence recombination, respectively.

I. Filling the Blank

1. Select the sentence "The Chinese calendar contains cycles of twelve years." from the learning database 10 as the test problem source.
2. Select the test problem model of filling the blank from the problem model database 30.
3. According to the requirements of the problem model for filling the blank, the grammar analysis engine 40 analyzes the words in the sentence, removes one word "years" that can be transformed according to the rules given in the grammar database 20 and changes it into its singular form "year".
4. The word "years" in the original sentence is removed and replaced by a blank, with its singular form "year" following. The sentence in the learning database 10 is transformed into the following Problem A and displayed on output devices such as a monitor or an LCD display. The learner provides his or her answer through input devices such as a mouse or keyboard.

| Problem A: | The Chinese calendar contains cycles of twelve —. (year) |
|---|---|

5. The grammar analysis engine 40 determines whether the answer given by the learner is correct according to the grammar database 20.
6. If the answer is incorrect, the grammar analysis engine 40 provides the correct one "years" according to the grammar database 20 along with the explanation "plural form of the noun should be used", and the learner can move on to the next problem. The screen displayed is, for example,

| Wrong answer. |
|---|
| Analysis: Plural form of the noun should be used. |
| Correct answer: years. |
| Chinese translation:二年爲一週中國的曆法包含十二年爲一週樹。 |

II. Selection

1. Select the sentence "The Chinese calendar contains cycles of twelve years." from the learning database 10 as the test problem source.
2. Select the test problem model of selection from the problem model database 30.
3. According to the requirements of the problem model for selection, the grammar analysis engine 40 analyzes the words in the sentence, chooses one word "contains" to analysis its attribute and transformation, and selects the corresponding transformations of three different verbs according to the word form transformation rules given in the grammar database 20 and guarantees the uniqueness of the correct answer. For example, the words "made", "fall", "thanks" along with "contains" are chosen to form selection items.

4. The sentence in the learning database 10 is transformed into the following Problem B according to the information in the problem model database 30. The problem is displayed on output devices such as a monitor or an LCD display. The learner provides his or her answer through input devices such as a mouse or keyboard.

| Problem B: | The Chinese calendar __ cycles of twelve years. |
|---|---|
| | A. made   B. contains   C. thinks   D. fall |

5. The grammar analysis engine 40 determines whether the answer given by the learner is correct according to the grammar database 20.
6. If the answer is incorrect, the grammar analysis engine 40 provides the correct one according to the grammar database 20, and the learner can move on to the next problem. For the example, the learner's answer is D; the grammar analysis engine 40 displays error information after determination and provides the correct answer B. "contains". The screen displayed is, for example,

| Wrong answer. |
|---|
| Correct answer: contains. |
| Chinese translation:二年爲一週中國的曆法包含十二年爲一週樹。 |

III. Sentence recombination

1. Select the sentence "The Chinese calendar contains cycles of twelve years." from the learning database 10 as the test problem source.
2. Select the test problem model of sentence recombination from the problem model database 30.
3. According to the requirements of the problem model for selection, the grammar analysis engine 40 analyzes the words in the sentence and performs transformations according to the word form transformation rules given in the grammar database 20 and reordering the words. For example, one gets "twelve calendar cycle the of year Chinese contain.".
4. The sentence in the learning database 10 is transformed and reordered into the following Problem C according to the information in the problem model database 30. The problem is displayed on output devices such as a monitor or an LCD display. The learner provides his or her answer through input devices such as a mouse or keyboard.

| Problem C: | |
|---|---|
| — | The Chinese calendar contains |
| twelve calendar cycle the of year Chinese contain | twelve cycle of year |

5. When the learner is making a sentence, if a word with transformations is selected the grammar analysis engine 40 provides all transformations of the word according to the contents in the grammar database 20 for the learner to use. When all words in the sentence are chosen and the sentence is completed, the grammar analysis engine 40 determines whether the learner's answer is correct.
6. If the answer is incorrect, the grammar analysis engine 40 displays according to the contents in the grammar database 20 the following error message and the correct answer. Then the learner can move on to the next problem.

Wrong answer.
Correct answer: The Chinese calendar contains cycles of twelve years.
Chinese translation: 二年為一週中國的曆法包含十二年為一週期。

This invention achieves the following goals and effects:
1. The learner is allowed to enter and store language data such as texts, real-time news, and articles in the learning database to expand and update the database. Therefore, the learner can update the learning database at any time according to the learning contents to achieve the goal of practicing while learning.
2. Since the invention is equipped with a problem model database, one only needs to select a test problem model to make a specific test problem out of a sentence in the learning database. The test can be focused on different words or grammatical rules in one sentence for the learner to master the language from different perspectives.
3. There are many test problem models in the problem model database. In particular, the problem models of filling the blank, selection, and sentence recombination emphasize on different word transformations, which does not only enforce the learner's memory on vocabulary but also achieves the goal of practical uses of the words.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A language learning system for learning a language through electronic devices, wherein said electronic device is personal computers (PC), notebook computers, handheld personal computers (HPC), or electronic translators, which system comprises:
    a learning database, which stores language data that the learner needs;
    a grammar database, which stores the grammatical rules of the language as the grammar basis;
    a problem model database, which stores different sorts of test problem models to provide multiple choices of problem styles in a test for the learner to take; and
    a grammar analysis engine, which analyzes the grammar of the language data in the learning database, converts the language data into test problems according to the test problem models stored in the problem model database, and performs a language test and provides test results.

2. The system according to claim 1, wherein the language data in the learning database comprises texts, real-time news and articles provided by the learner.

3. The system according to claim 1, wherein the language data in the learning database comprises a test base designed in advance.

4. The system according to claim 1, wherein the grammar database includes at least one grammatical data selected from the group consisting plural forms of nouns, tenses of verbs, voices, active or passive voices, and word form transformations.

5. The system according to claim 1, wherein the problem model database includes at least one test problem model selected form the group consisting filling the blank, selection, sentence recombination and correction test problem models.

6. A method for learning a language through a computer, which comprises the steps of:
    building a test system in a computer comprising a language learning database, a grammar database, a problem model database, and a grammar analysis engine;
    selecting a sentence from the learning database as the test problem source;
    selecting a test problem model from the problem model database;
    analyzing the grammar of the selected sentence and storing it in a buffer;
    generating a test problem by converting the grammatically analyzed sentence into a problem according to the selected test problem model; and
    performing a test.

7. The method according to claim 6, wherein the learning database is built through the steps of:
    entering the language data provided by the learner into the learning database;
    separating the language data into individual sentences and storing them into a recording media accessible by the computer;
    deleting repeated sentences; and
    deleting sentences that the learner considers as unnecessary.

8. The method according to claim 6, wherein the step of selecting a sentence is performed by the learner.

9. The method according to claim 6, wherein the step of selecting a test problem model is performed by the learner.

10. The method according to claim 6, wherein the step of analyzing the grammar of the selected sentence is to find the attribute of each word in the selected sentence.

* * * * *